US011200244B2

(12) United States Patent
McIntosh et al.

(10) Patent No.: US 11,200,244 B2
(45) Date of Patent: *Dec. 14, 2021

(54) KEYWORD REPORTING FOR MOBILE APPLICATIONS

(71) Applicant: App Annie Inc., San Francisco, CA (US)

(72) Inventors: Nicholas Ian McIntosh, Oakland, CA (US); Fang Nan, Beijing (CN); Zhiming Zhang, Beijing (CN); Chen Liu, Beijing (CN); Xuesong Ding, Beijing (CN); Matthew James Hunter, San Francisco, CA (US)

(73) Assignee: App Annie Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,143

(22) Filed: Apr. 28, 2020

(65) Prior Publication Data

US 2020/0257695 A1    Aug. 13, 2020

Related U.S. Application Data

(63) Continuation of application No. 14/705,883, filed on May 6, 2015, now Pat. No. 11,144,555.

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/338* (2019.01); *G06F 16/3334* (2019.01); *G06F 16/951* (2019.01); *G06F 16/9536* (2019.01)

(58) Field of Classification Search
CPC ........... G06F 16/24578; G06F 16/3334; G06F 16/338; G06F 16/951; G06F 16/9536
See application file for complete search history.

(56) References Cited

U.S. PATENT DOCUMENTS 8,898,155 B2    11/2014  Tang
9,720,983 B1 *   8/2017  Yu .......................... G06Q 30/02
(Continued)

FOREIGN PATENT DOCUMENTS

KR    20130122424 A  * 11/2013

OTHER PUBLICATIONS

PCT International Search Report and Written Opinion, PCT Application No. PCT/US2016/031340, dated Jan. 25, 2017, 15 pages.
(Continued)

*Primary Examiner* — Diedra McQuitery
(74) *Attorney, Agent, or Firm* — Fenwick & West LLP

(57) ABSTRACT

A keyword reporting system for mobile applications is disclosed that generates keyword reports for a subject mobile application. The reports include a set of most relevant keywords for the subject mobile application with their associated ranking and result value. The ranking of a keyword is the subject mobile application's position in a search result for the keyword. A result value is determined for each keyword as well, where the result value is the number of mobile applications found in a search result for the keyword. Based on the ranking and result value of each keyword, a weight value is determined for each keyword. The weight value indicates the relevance of the keyword for the subject mobile application. A set of keywords are sorted and selected based on the weight value and a keyword report is generated that includes the set of keywords along with their rankings.

16 Claims, 4 Drawing Sheets

(51) Int. Cl.
*G06F 16/338* (2019.01)
*G06F 16/951* (2019.01)
*G06F 16/33* (2019.01)
*G06F 16/9536* (2019.01)

(56) References Cited

U.S. PATENT DOCUMENTS

| | | | |
|---|---|---|---|
| 2003/0177124 A1* | 9/2003 | Sauri | G06F 16/93 |
| 2009/0198674 A1 | 8/2009 | Custis et al. | |
| 2012/0116905 A1 | 5/2012 | Futty et al. | |
| 2012/0123855 A1 | 5/2012 | Gu | |
| 2012/0179662 A1* | 7/2012 | Myaeng | G06F 16/9535 707/706 |
| 2012/0240236 A1* | 9/2012 | Wyatt | G06F 21/10 726/25 |
| 2012/0269116 A1 | 10/2012 | Xing et al. | |
| 2012/0278194 A1 | 11/2012 | Dewan et al. | |
| 2012/0290448 A1 | 11/2012 | England et al. | |
| 2013/0091142 A1* | 4/2013 | Joseph | G06Q 30/0277 707/748 |
| 2013/0159134 A1* | 6/2013 | Chervirala | G06Q 30/02 705/26.7 |
| 2013/0191397 A1 | 7/2013 | Avadhanam et al. | |
| 2014/0006418 A1 | 1/2014 | Forte et al. | |
| 2014/0164367 A1 | 6/2014 | Lee | |
| 2014/0236846 A1* | 8/2014 | Melika | G06Q 10/06 705/310 |
| 2014/0257973 A1* | 9/2014 | Zamanzadeh | G06Q 30/0244 705/14.45 |
| 2014/0278986 A1 | 9/2014 | Rouse et al. | |
| 2015/0058712 A1 | 2/2015 | Berk et al. | |
| 2015/0332373 A1* | 11/2015 | Pang | G06Q 30/0631 705/26.7 |
| 2016/0099963 A1* | 4/2016 | Mahaffey | G06F 21/554 726/25 |
| 2016/0239569 A1* | 8/2016 | Levy | G06F 16/951 |
| 2017/0004524 A1* | 1/2017 | Ma | G06Q 30/0245 |

OTHER PUBLICATIONS

United States Office Action, U.S. Appl. No. 14/705,883, filed Jun. 15, 2020, 10 pages.
United States Office Action, U.S. Appl. No. 14/705,883, filed Oct. 21, 2019, 13 pages.
United States Office Action, U.S. Appl. No. 14/705,883, filed Apr. 4, 2019, 14 pages.
United States Office Action, U.S. Appl. No. 14/705,883, filed Jul. 18, 2018, 22 pages.
United States Office Action, U.S. Appl. No. 14/705,883, filed Oct. 10, 2017, 16 pages.
United States Office Action, U.S. Appl. No. 14/705,883, filed Mar. 18, 2021, 11 pages.

* cited by examiner

KEYWORD REPORTING FOR MOBILE APPLICATIONS

BACKGROUND

This invention relates generally to the field of keyword selection, in particular to keyword selection for mobile applications.

Keyword search is a common way for users to search for content over the internet. The same applies for application search at application stores. Mobile or portable electronic device users often tend to search for applications using keywords. For example, if a user wants to search for a coffee related application, the user may search for keywords such as coffee, barista, coffee shop and the like. Application developers may tag a few keywords they find relevant to their application. It may be highly beneficial for application developers to obtain a keyword report relevant to their application that includes a list of the most relevant keywords and their rankings related to the application domain.

SUMMARY

A keyword reporting system for mobile applications configures reports that include a set of most relevant keywords and associated rankings for a subject mobile application. The system collects a set of keywords from public sources such as a plurality of mobile applications that are a part of one or more application stores, for example, the iOS app store or the Google Play or other such similar application stores. Additionally, it can receive keywords from a user such as an application developer or collect keywords from private sources such as an open source word list. Based on the collected set of keywords, the system builds a keyword dictionary that supports keywords for a set of languages. The keyword dictionary is stored in a keyword storage database and is maintained periodically.

On receiving a request for selecting keywords for a subject mobile application, the keyword reporting system retrieves a list of keywords from the keyword storage database that have a ranking for the subject mobile application. The ranking of a keyword is the subject mobile application's position in a search result for the keyword. A result value is determined for each keyword as well, where the result value is the number of mobile applications found in a search result for the keyword. For each of the keywords, a weight value is determined based on a frequency analysis of the keyword amongst the mobile applications that have a ranking for the keyword. The weight value indicates the relevance of the keyword for the subject mobile application. A set of keywords are sorted and selected based on the weight value and a keyword report is generated that includes the set of keywords along with their rankings. The mobile application developer or any other user can view the keyword report and perform further analysis on keyword usage for their mobile application or the subject mobile application.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
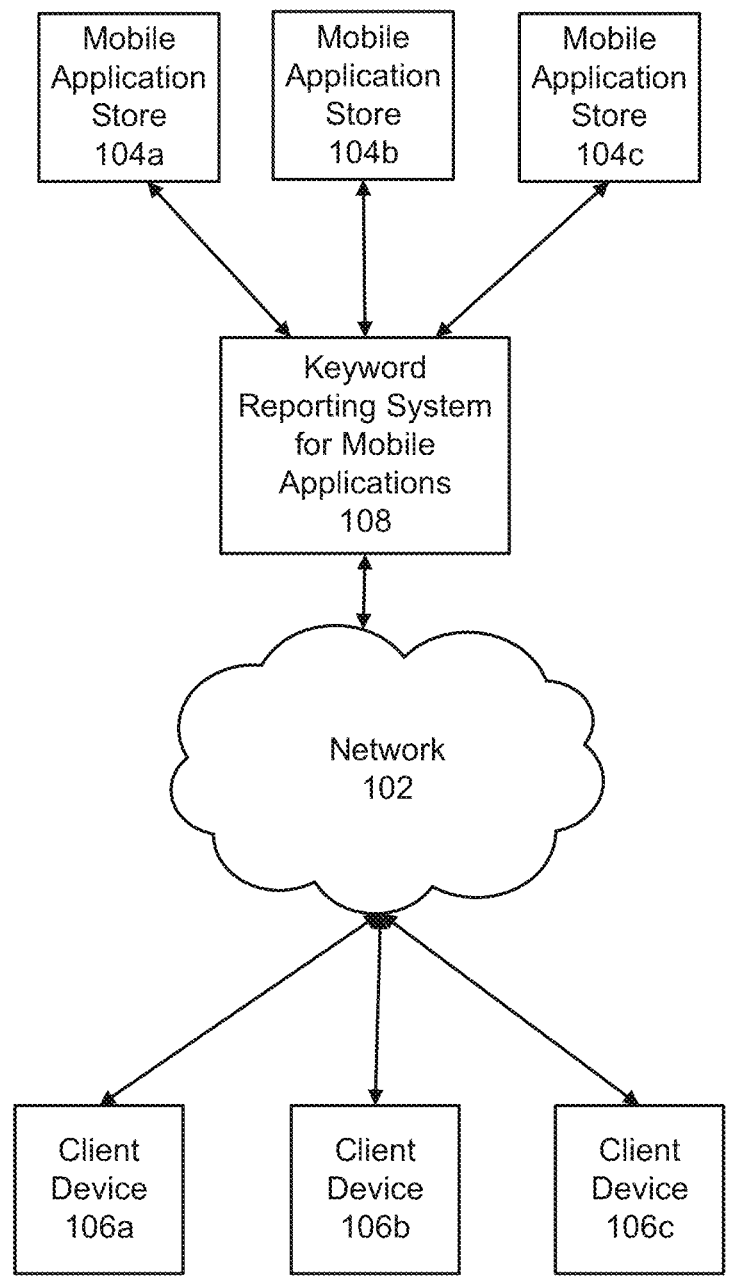
FIG. 1 is a block diagram illustrating a computing environment for keyword reporting system for mobile applications according to one embodiment of the present disclosure.

FIG. 1 is a block diagram illustrating a computing environment for keyword reporting system for mobile applications according to one embodiment of the present disclosure. The computing environment 100 shown by FIG. 1 comprises one or more client devices 106, a network 102, one or more mobile application stores 104 and a keyword reporting system for mobile applications 108. In alternative configurations, different and/or additional components may be included in the system environment 100.

The client devices 106 are one or more computing devices capable of receiving user input as well as transmitting and/or receiving data via the network 102. In one embodiment, a client device 106 is a smartphone, a tablet or a conventional computer system, such as a desktop or laptop computer. Alternatively, a client device 106 may be a device having computer functionality that accesses a set of mobile applications. A client device 106 is configured to communicate via the network 102. In one embodiment, a client device 106 executes an application allowing a user of the client device 106 to interact with the keyword reporting system for mobile applications 108. For example, a client device 106 executes a browser application to enable interaction between the client device 106 and the keyword reporting system 108 via the network 102. In another embodiment, a client device 106 interacts with the keyword reporting system 108 through an application programming interface (API) running on a native operating system of the client device 106, such as IOS® or ANDROID™.

The client devices 106 are configured to communicate via the network 102, which may comprise any combination of local area and/or wide area networks, using both wired and/or wireless communication systems. In one embodiment, the network 102 uses standard communications technologies and/or protocols. For example, the network 102 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 102 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 102 may be encrypted using any suitable technique or techniques.

One or more mobile application stores 104 may be coupled to the keyword reporting system 108 that provides keyword reports for applications that are executed by a client device 106. A mobile application store 104 includes downloadable mobile applications and catalogs for the mobile applications. A mobile application developer provides a set of known keywords that allow the mobile application to be searchable based on those keywords. Additionally keywords can be extracted from the metadata information such as the title, description, URL, publisher, categories, sub-categories, application store searches, etc. for the mobile application that is stored in the mobile application store 104. Exemplary mobile application stores include the Apple iOS Store, Google Play store, Amazon application store, Mac application store, Windows application store and other such stores.

The keyword reporting system for mobile applications 108 analyzes keywords for a subject mobile application and generates reports that include a list of relevant keywords for the subject mobile application based on determined relevance weights for the keywords. The keyword reporting system 108 retrieves keywords from a keyword dictionary that is built based on keywords collected from the metadata of the plurality of applications from one or more mobile application stores. Examples of metadata include the title of the application, the description of the application, user comments or rating for the application, information about the publisher of the application, etc. Additionally, a user such as the application developer may request to add to the list of keywords. For each keyword, the keyword reporting system determines a ranking. A ranking is based on the position of a mobile application in a search result for the keyword.

Additionally, a result value is determined for each keyword that is based on the number of mobile applications found in the search results of each keyword. For each of the keywords, a weight value is determined based on a frequency analysis of the keyword amongst the mobile applications that have a ranking for the keyword and the top N keywords are selected. The selected N keywords are sorted based on the weight value and is used to generate the keyword ranking report for the subject mobile application.

Figure 2:
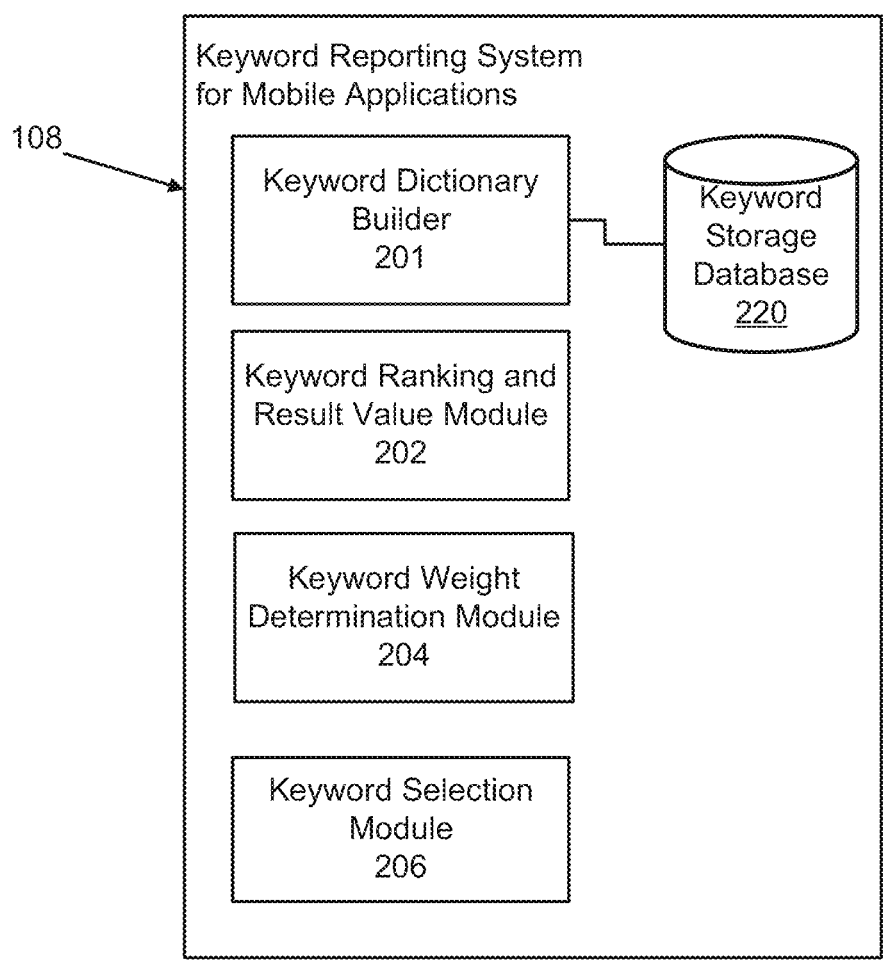
FIG. 2 is a block diagram illustrating logical components of a keyword reporting system for mobile applications according to one embodiment of the present disclosure.

FIG. 2 is a block diagram illustrating logical components of a keyword reporting system for mobile applications according to one embodiment of the present disclosure. The logical components include a keyword dictionary builder 201, keyword ranking and result value module 202, a keyword weight determination module 204 and a keyword selection module 206.

The keyword dictionary builder 201 builds a keyword dictionary that includes a master-list of keywords collected from one or more public or private sources. It supports keywords for a set of languages as well as phrase-based keywords such as "homes for sale." The public sources include keywords collected from the metadata of published mobile applications at one or more mobile application stores. Example metadata include application title, description, publisher name, URL, application search suggestions, etc. The private sources include collecting keywords from an open-source word list or other such third-party source.

Each keyword has a status of either active or inactive stored based on a set of countries and a set of application platforms. A keyword is marked inactive if it already exists in the dictionary; or is one of a set of "stop words," such as to, go, in, a, etc.; or if the keyword does not have a significant number of mobile applications returned on a search for the keyword. A user-provided keyword may be always marked as active.

Keywords are scraped periodically. Scraping a keyword involves searching for mobile applications in one or more mobile application stores 104 for the keyword. Each keyword is stored in the keyword storage database 220 with its associated information such as "date created," the status of the keyword (active/inactive) for each country and each application platform, the results on last scrape for each country and each application platform and the source of the keyword.

The keyword dictionary builder maintains the keyword dictionary by periodically scraping keywords, discovering new keywords, adding custom keywords from a user, updating the active/inactive status, and removing inactive keywords.

On receiving a request for generating a keyword report for a mobile application, the keyword ranking and result value module 202 retrieves a set of relevant keywords for the subject mobile application. For example, a request to generate a keyword report for "Starbucks coffee company" application is received. A subset of keywords is retrieved from the keyword storage database 220. For the example above, the set of keywords may include, amongst others, "coffee," "sbux," "starbucks," "coffee order," "egift," "tea," "tipping," "food watch," "fod" and "mobile payment". For each keyword, the keyword ranking and result value module 202 determines a ranking and a result value. A ranking is the subject mobile applications position in the search result for the keyword. For the example above, when a search is conducted for the keyword "coffee", "Starbucks coffee company" may be at position 1, or if a search is conducted for the keyword "food watch", "Starbucks coffee company" may be at position 25, thus 1 and 25 are rankings for the keywords "coffee" and "food watch" for the mobile application "Starbucks coffee company". The position of the application for a keyword may be obtained from one or more application stores 104.

Further, for each keyword, a result value is determined by conducting a search for each keyword. The result value is the total number of mobile applications that are included in the search result for the keyword at one or more application stores 104. For the example above, the search for keyword "coffee" returns a list of 2100 mobile applications and the search for keyword "food watch" returns a list of 2050 mobile applications.

The keyword weight determination module 204 receives the set of keywords along with their rankings and result values. For each of the keywords, a weight value is determined based on a frequency analysis of the keyword amongst the mobile applications that have a ranking for the keyword. For each keyword, a list of mobile applications that have a ranking for the keyword is obtained. The number of mobile applications included in that list is extracted from the result value of the keyword.

For each mobile application in the list, the frequency of the keyword appearing in the associated information of the mobile application is determined. For example, the occurrence of the keyword in the application's title is counted. The count is divided by the result value, and a numerical weight value is determined. The weight value indicates the relevance of the keyword across the list of mobile applications for that keyword.

Continuing the example above, the frequency of the keyword "coffee" across the titles of 2100 mobile applications is 2000, and the frequency of the keyword "food watch" across the titles of 2050 mobile applications is 150. The weight value for the keyword is determined to be 2000/2100 (i.e. approximately 0.9) whereas the weight value for the keyword is determined to be 150/2050 (i.e. 0.073). The example shows that the keyword "coffee" is more relevant to the mobile application "Starbucks coffee company" than the keyword "food watch." If the weight value for a keyword is 0, the keyword is marked as inactive. For example, a typo in the description of an application may get the keyword included in the retrieved set of keywords but may not occur in the title of any mobile applications, such as the keyword "fod" may not be found in any of the mobile application titles. The weight value for such a keyword may be zero, leading the system to mark the keyword as inactive.

The keyword selection module 206 receives the set of keywords and an associated weight value for each keyword. and selects the top N (e.g., N=25) keywords based on the weight value of each keyword (i.e., if the weight value is higher, the keyword is more relevant to the subject mobile application). For the example above, the keyword "coffee" is at the top of the list with a weight value of 0.9.

The keyword selection module 206 sorts each of the set of N keywords based on their weight value to generate a keyword report with the sorted list of top N keywords for the subject mobile application. Continuing with the example, the top five keywords based on the weight value include "coffee," "starbucks," "sbux," "starbucks coffee," and "coffee order." The generated report displays the top N keywords and includes the ranking and the result value of each keyword.

Figure 3:
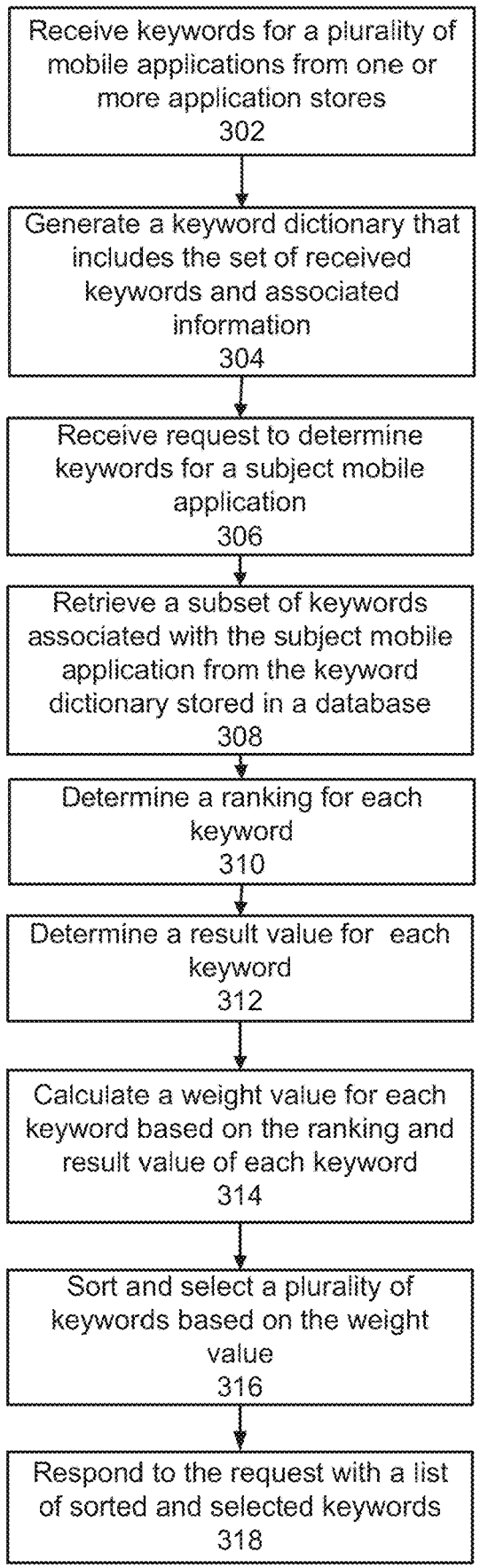
FIG. 3 is a flow diagram illustrating a method for determining and selecting keywords for a mobile application according to one embodiment of the present disclosure.

FIG. 3 is a flow diagram illustrating a method for selecting keywords for a mobile application according to one embodiment of the present disclosure. The keyword reporting system for mobile applications 108 receives 302 keywords for a plurality of mobile applications from one or more application stores 104. The keywords may be extracted from the metadata of a published mobile application such as from the title, description, or publisher/developer provided keywords and similar metadata. Based on the keywords, a keyword dictionary is generated 304 and the keyword dictionary is stored in the keyword storage database 220. The keyword dictionary is maintained over a regular period of time. The keyword reporting system 108 receives 306 a request to determine keywords for a subject mobile application. In response to the request, the keyword reporting system 108 retrieves 308 from the keyword dictionary stored in the keyword storage database 220, a subset of keywords associated with the subject mobile application.

The keyword reporting system 108 determines 310 a ranking for each keyword, wherein the ranking is the subject mobile application's position in a search result for the keyword. Further, for each keyword a result value is determined 312, the result value indicating the number of mobile applications returned in a search result for the keyword.

Based on the ranking and the result value for each keyword, a weight value is calculated 314 that determine the relevance of the keyword for the subject mobile application based on a keyword frequency analysis across the mobile applications that have a ranking for the keyword. Based on the weight value, the keywords are sorted, and the top N keywords are selected 316. The N keywords are listed along with their ranking and result values to generate a keyword report that is sent to the user in response 318 to the request for selecting keywords for the subject mobile application.

Figure 4:
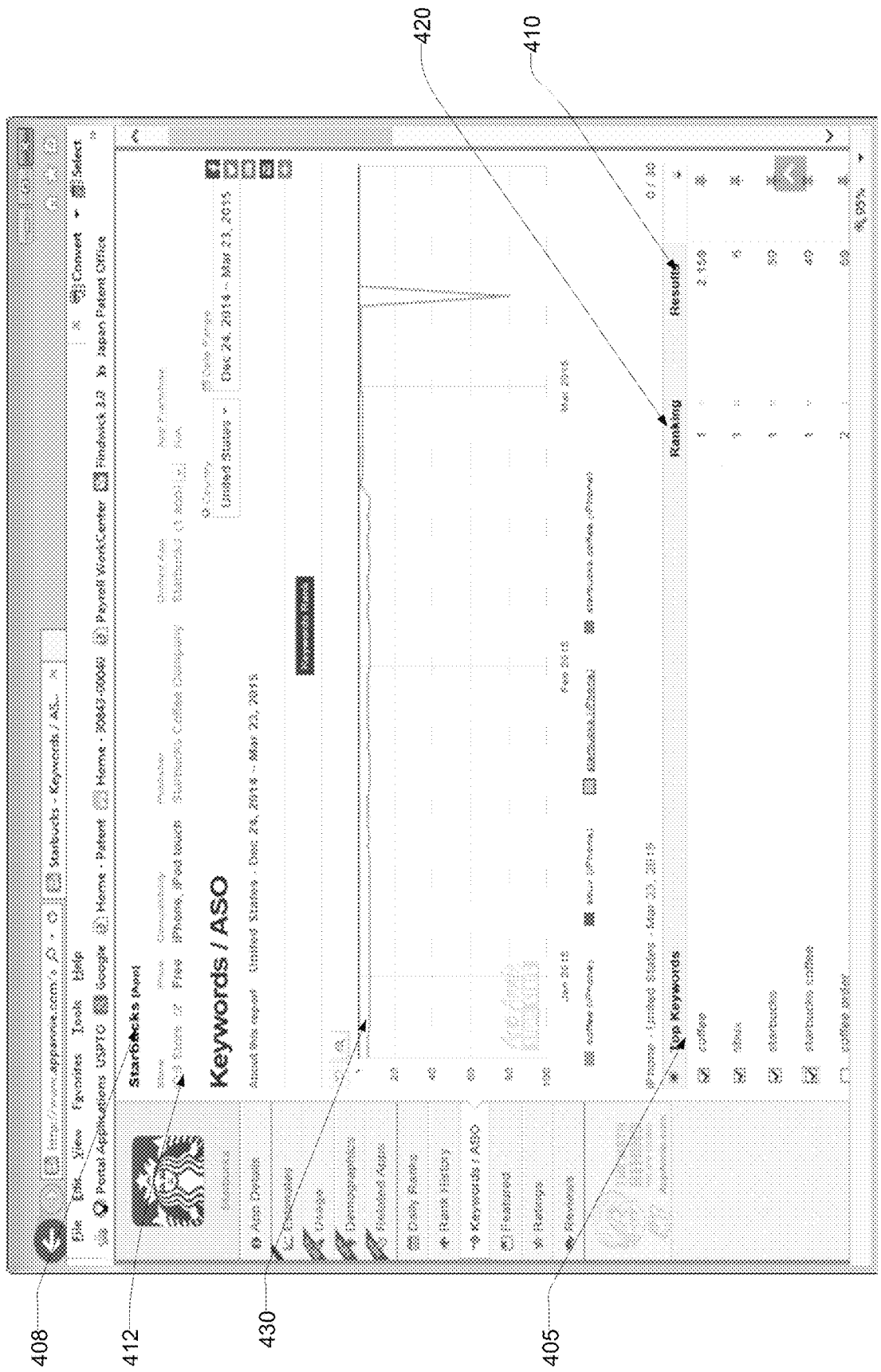
FIG. 4 is an exemplary report illustrating keyword rankings for a mobile application according to one embodiment of the present disclosure.

FIG. 4 is an exemplary report illustrating keyword rankings for a mobile application according to one embodiment of the present disclosure. The exemplary keyword report is for subject mobile application "starbucks" 408 published at iOS Store, an application store 412. The report includes the list of top keywords 405 with its ranking 420 and result value 410. Additionally, the graph 430 shows the keyword rank of each of the keywords over a period of time (e.g. January 2015-March 2015).

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:
1. A method comprising:
    scraping a plurality of keywords periodically, where the scraping comprises determining a number of mobile applications returned as a result of a search for the keyword at a point in time at which the keyword was scraped;

storing, in a database, the scraped keywords in association with additional information associated with the scraping of the keyword;

receiving, from a client device, a request to output an identification of relevant keywords for a subject mobile application;

in response to receiving the request, retrieving a set of keywords associated with the subject mobile application from the database; and sending, to the user, the retrieved set of keywords.

2. The method of claim 1, further comprising retrieving, for each keyword of the set of keywords, a status of the keyword for one or more countries and a status of the keyword for one or more mobile application stores.

3. The method of claim 2, wherein the status of the keyword is at least one of active or inactive.

4. The method of claim 1, wherein the additional information comprises a frequency of the keyword in metadata of each mobile application associated with the database.

5. The method of claim 1, wherein the set of keywords includes at least one of keywords received from the client device, an open-source custom word list, and keywords extracted from metadata of the subject mobile application.

6. The method of claim 5, wherein a status of the keywords received from the client device is always active.

7. The method of claim 5, wherein the metadata of the subject mobile application includes title, description, publisher, uniform resource locator (URL), categories and sub-categories.

8. A non-transitory computer-readable medium comprising memory with instructions encoded thereon, the instructions causing one or more processors to perform operations when executed, the instructions comprising instructions to:

scrape a plurality of keywords periodically, where the scraping comprises determining a number of mobile applications returned as a result of a search for the keyword at a point in time at which the keyword was scraped;

store, in a database, the scraped keywords in association with additional information associated with the scraping of the keyword;

receive, from a client device, a request to output an identification of relevant keywords for a subject mobile application;

in response to receiving the request, retrieve a set of keywords associated with the subject mobile application from the database; and send, to the user, the retrieved set of keywords.

9. The non-transitory computer-readable medium of claim 8, the instructions further comprising instructions to retrieve, for each keyword of the set of keywords, a status of the keyword for one or more countries and a status of the keyword for one or more mobile application stores.

10. The non-transitory computer-readable medium of claim 9, wherein the status of the keyword is at least one of active or inactive.

11. The non-transitory computer-readable medium of claim 8, wherein the additional information comprises
a frequency of the keyword in metadata of each mobile application associated with the database.

12. The non-transitory computer-readable medium of claim 8, wherein the set of keywords includes at least one of keywords received from the client device, an open-source custom word list, and keywords extracted from metadata of the subject mobile application.

13. The non-transitory computer-readable medium of claim 12, wherein a status of the keywords received from the client device is always active.

14. The non-transitory computer-readable medium of claim 12, wherein the metadata of the subject mobile application includes title, description, publisher, uniform resource locator (URL), categories and sub-categories.

15. A system comprising:

memory with instructions encoded thereon; and one or more processors that, when executing the instructions, are caused to perform operations comprising:

scraping a plurality of keywords periodically, where the scraping comprises determining a number of mobile applications returned as a result of a search for the keyword at a point in time at which the keyword was scraped;

storing, in a database, the scraped keywords in association with additional information associated with the scraping of the keyword;

receiving, from a client device, a request to output an identification of relevant keywords for a subject mobile application;

in response to receiving the request, retrieving a set of keywords associated with the subject mobile application from the database; and sending, to the user, the retrieved set of keywords.

16. The system of claim 15, the operations further comprising retrieving, for each keyword of the set of keywords, a status of the keyword for one or more countries and a status of the keyword for one or more mobile application stores.

* * * * *